(12) United States Patent
Cangiano et al.

(10) Patent No.: US 8,663,386 B2
(45) Date of Patent: Mar. 4, 2014

(54) DRY CEMENT MIX FOR FORMING LIGHT CONCRETES WITH LOW THERMAL CONDUCTIVITY, AND CONCRETES THUS OBTAINED

(75) Inventors: Stefano Cangiano, Torre de Roveri (IT); Alessandro Morbi, Sarnico (IT)

(73) Assignee: Italcementi S.p.A., Bergamo (IT)

( * ) Notice: Subject to any disclaimer, the term of this patent is extended or adjusted under 35 U.S.C. 154(b) by 0 days.

(21) Appl. No.: 13/807,415

(22) PCT Filed: Jul. 7, 2011

(86) PCT No.: PCT/EP2011/061485
§ 371 (c)(1),
(2), (4) Date: Dec. 28, 2012

(87) PCT Pub. No.: WO2012/004335
PCT Pub. Date: Jan. 12, 2012

(65) Prior Publication Data
US 2013/0098270 A1    Apr. 25, 2013

(30) Foreign Application Priority Data
Jul. 8, 2010   (IT) .............................. MI2010A1260

(51) Int. Cl.
*C04B 14/22*  (2006.01)
*C04B 28/02*  (2006.01)
*C04B 38/08*  (2006.01)

(52) U.S. Cl.
USPC ........... 106/814; 106/676; 106/705; 106/716; 106/782; 106/816

(58) Field of Classification Search
USPC .......... 106/676, 705, 710, 716, 782, 814, 816
See application file for complete search history.

(56) References Cited

U.S. PATENT DOCUMENTS

| | | | |
|---|---|---|---|
| 3,856,054 A * | 12/1974 | Steinberg et al. | 138/174 |
| 4,086,098 A * | 4/1978 | Le Ruyet et al. | 106/668 |
| 5,051,453 A * | 9/1991 | Okabayashi et al. | 523/116 |
| 5,445,880 A | 8/1995 | Martiny | |
| 6,616,752 B1 | 9/2003 | Basura et al. | |
| 6,699,321 B2 * | 3/2004 | Pelot et al. | 106/711 |
| 6,743,287 B2 * | 6/2004 | Sunde | 106/697 |
| 7,150,843 B2 | 12/2006 | Schmid | |
| 7,700,017 B2 * | 4/2010 | McCarthy et al. | 264/71 |
| 7,771,529 B1 * | 8/2010 | McPherson | 106/716 |
| 8,137,454 B2 * | 3/2012 | McPherson | 106/716 |
| 8,236,230 B2 * | 8/2012 | McPherson | 264/333 |
| 8,480,802 B2 * | 7/2013 | McPherson | 106/716 |
| 2007/0104949 A1 * | 5/2007 | Bunge | 428/402 |
| 2008/0156038 A1 | 7/2008 | Dennert | |
| 2008/0299413 A1 | 12/2008 | Song et al. | |
| 2009/0012191 A1 | 1/2009 | Deans | |

FOREIGN PATENT DOCUMENTS

| | | |
|---|---|---|
| DE | 102006017199 B3 | 11/2007 |
| EP | 0292424 A2 | 11/1988 |
| EP | 0906816 A1 | 4/1999 |
| EP | 1705165 A1 * | 9/2006 |
| GB | 2425532 A * | 11/2006 |
| SU | 1698231 A1 | 12/1991 |
| WO | WO03097553 A1 | 11/2003 |

OTHER PUBLICATIONS

Gorlov et al.; "Corrosion Resistant Concrete—Contains Fine and Coarse Fraction of Specified Glass, Alkaline Activator, and Water", Database WPI; 1984; XP002985157; Abstract.
International Search Report of PCT/EP2011/061485; dated Oct. 4, 2011.

* cited by examiner

*Primary Examiner* — Anthony J Green
(74) *Attorney, Agent, or Firm* — Abelman, Frayne & Schwab

(57) ABSTRACT

A dry cement mix based on a hydraulic binder and a glass aggregate for forming light concretes with low thermal conductivity, characterized in that said glass aggregate comprises a fine fraction consisting of granulated aggregate with a particle size from 0.5 to 2 mm, and a coarse fraction consisting of crushed aggregate with a particle size from 4 to 20 mm, obtaining for said glass aggregate a well-defined overall particle size distribution.

12 Claims, 1 Drawing Sheet

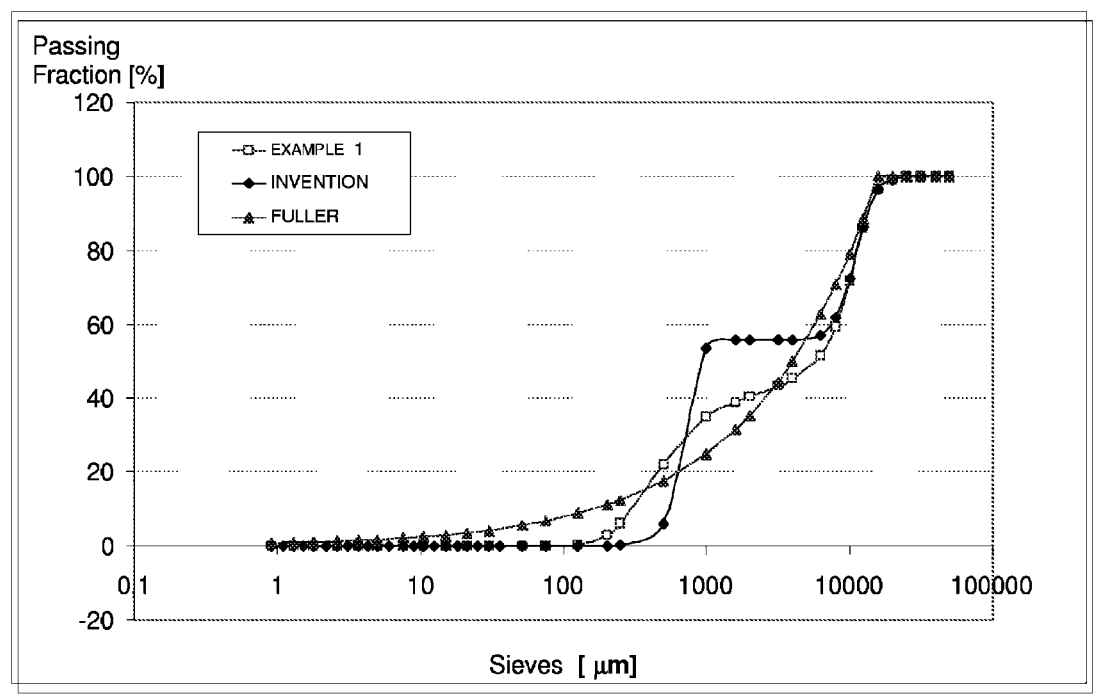

DRY CEMENT MIX FOR FORMING LIGHT CONCRETES WITH LOW THERMAL CONDUCTIVITY, AND CONCRETES THUS OBTAINED

FIELD OF THE INVENTION

The present invention relates to dry mixes, known as "dry mix" or "raw mix", for the casting of construction elements made from concrete with low thermal conductivity, including a hydraulic binder, in particular cement, and light aggregates.

PRIOR ART

In recent years, energy efficiency has become increasingly important in the construction industry. In fact, the new European legislation (European Directive 2002/91/EC) lays down the minimum energy performance for newly constructed buildings or those subject to significant restructuring. Heat transfer between the internal and external environments is regulated by new and more stringent thermal transmittance values.

To meet the thermal transmittance requirements, many insulating materials have been produced; the best in this respect are organic materials such as polystyrene or polyurethane, because very low density can be achieved. However, they have an extremely high resistance to water vapour, low thermal inertia and, in the event of fire, can produce toxic gases in some cases.

Lightweight concretes are an alternative to the use of organic materials to achieve good performance in terms of thermal transmittance, vapor permeability and thermal inertia.

If made from suitable aggregates, such materials may have the advantage of environmental sustainability, because they are more easily recycled.

In addition, the use of lightweight concretes prevents the problems due to the emission of toxic gases in case of fire.

In general, lightweight concretes are cementitious materials characterised by low density (from 800 Kg/m$^3$ to 2000 Kg/m$^3$ according to the UNI EN 206-1 standard). The reduction in specific weight is due to their porous structure that provides good thermal insulation properties. This type of lightweight structure can be obtained by replacing traditional aggregates with lightweight aggregates and/or by using air-entraining agents that are able to generate microbubbles of air within the cement paste.

Such concretes are suitable especially for non-structural construction elements, such as in-fill panels, blocks, screeds and the like.

The lightweight aggregates may be selected from: expanded clay obtained by heat treatments of clay, volcanic pumice, industrial byproducts such as skimmings and blast furnace slag, or recycled materials such as foamed glass. Concretes in which expanded clay is used show good performance in terms of thermal transmittance, vapour permeability and thermal inertia, but the high interconnected porosity generates high water absorption. The absorption of water results in an increase in thermal conductivity and therefore a worsening of the insulation properties required of the material in addition to increased sensitivity to frost.

The pumice may have different characteristics in its composition depending on the location of the quarries from which it is extracted. Pumice from Lipari, for example, contains a percentage of silica higher than 70%, whereas pumice from other quarries can have a silica content of around 50-65%. The silica content greatly affects the quality of the silicate, increasing its hardness, mechanical strength and chemical resistance. After being milled to obtain different particle sizes, it can be treated with hydrophobic materials to make it waterproof.

The use of such materials therefore causes various problems related to the high water absorption, achievement of mechanical strengths and environmental sustainability for the use of inert quarry materials. The conductivity of the pumice increases due to absorption of water.

The use of products such as blast furnace slag in the production of concretes results in the lightening of the concrete, however, up to density values of not less than 2000 Kg/m$^3$.

Finally, the use of vitreous aggregates, preferably from recycling, is anticipated. Foamed glass is known as a thermal insulation and sound-absorbing material and at the same time is lightweight and shows good compressive strength. It is also breathable, chemically inert, stable over time and resistant to mould. Because of its mineral origin, it is incombustible and does not emit toxic fumes in case of fire.

The principal applications of foamed glass are as a bulk insulator in cavity walls, roofing, foundations of floors, attics, chimneys, or as an addition as a lightweight inert substance in the production of lightweight thermo-phono-insulating conglomerates for interstorey floors and retaining walls, workable lofts and flat and sloping roofs. As an inert substance, it is also used to produce heat-insulating and fire resistant coatings, mortar for masonry, stucco and adhesives, sound-absorbing panels for interior walls and freestanding panels for curtain walls.

So-called "crushed" foamed glass aggregates are produced by the expansion and subsequent crushing of glass or vitreous materials and an expanding agent. Such an agent allows the formation of air bubbles in the glass during the expansion phase and is composed of silicon and carbon, as well as borax or at least one metal oxide. The transition from liquid glass to foamed glass occurs via the direct addition of a foaming agent that releases gas immediately on contact with the hot liquid, thus allowing it to expand.

To produce foamed glass from recycled glass, the starting material consists of powdered glass or vitreous material that is mixed with a quantity of between 1.5% to 2.5% of the activator, also in the form of powder. The mix is then expanded in a single stage process at a temperature of between 750 and 900° C. The glass material obtained by this process shatters into a monogranular material when subjected to certain cooling conditions. The process for producing this aggregate of glass "by crushing" is described in patents EP 0292424 and U.S. Pat. No. 6,616,752. The foamed glass obtained by this process is characterised by high compressive strength, and is odourless and inert. The aggregates formed from this foam have a closed porosity such that liquids cannot penetrate into them. This means that the insulating properties of the aggregates remain unchanged even in humid environments, for which reason, as a consequence of not absorbing water, the weight per volume unit of such a product can vary only within certain limits and the use of such an aggregate for the preparation of concretes is such that the pores cannot be filled by the binder.

The aggregate formed "by crushing" is stable, does not degrade and, due to the entrained air, is a good insulator. Since it does not absorb water, it dries quickly, is refractory to fire and heat and resistant to environmental attacks. Its usual application is as a drainage layer or a thermal insulation layer, or for light filling of soundproof casings of roads and embankments, and especially as a thermal barrier for the ground and for flat roofs.

So-called "granulated" aggregates of foamed glass, on the other hand, are products for granulation and subsequent expansion through the following process: preparation of a mix of a glass binder containing water at room temperature, an expansion agent and a binding agent; addition to the mix of glass powder, preferably consisting of recycled glass, to form a moist mix of glass; homogenisation of the mix for 5 minutes and subsequent stirring for between 2 and 6 hours in order to partially merge the vitreous components; the mix is pumped with the addition of further glass powder in a granulation mixer to form the granules (green bodies); desiccation of the granules; classification into different sieve fractions by sieving; expansion of the same in rotary kilns at a temperature of around 790° C. to obtain expanded granular particles.

A granulated aggregate is described in the patents US 2008/0156038 and EP 0906816.

The granulated glass occurs in the form of spherical granules with fine pores of various sizes, of a milky white colour, with closed porosity that determines the insulating power. The material is thermo-insulating and phono-insulating and, at the same time, is lightweight and shows good compressive strength. Because of its mineral origin, this is incombustible and does not emit toxic fumes in case of fire. A "crushed" vitreous aggregate shows physical and mechanical properties of the following type:

| Water absorption (internal) | ~0% | |
|---|---|---|
| Water absorption (surface) | ~7% | |
| Fire resistance class | VI | DIN |
| Density | 400-450 | Kg/m$^3$ |
| Crushing test 8/16 | 0.40-0.45 | N/mm$^2$ |
| Crushing test 16/32 | 0.90-0.94 | N/mm$^2$ |

A "granulated" vitreous aggregate shows physical and mechanical properties of the following type:

| | | Sieve fraction | | | | | | |
|---|---|---|---|---|---|---|---|---|
| | | 0.1-0.3 | 0.2-0.7 | 0.25-0.5 | 0.5-1 | 0.5-1.25 | 1-2 | 8-16 |
| Compressive strength | [MPa] | 2.8 | 6.5 | 2.6 | 2 | 1.9 | 1.6 | 0.8 |
| Density | [Kg/l] | 0.9 | 0.95 | 0.59 | 0.47 | 0.46 | 0.39 | 0.27 |
| Thermal conductivity | [W/mK] | 0.07 | 0.07 | 0.07 | 0.07 | 0.07 | 0.07 | 0.07 |
| Surface water absorption | [%] | 35 | 20 | 30 | 25 | 22 | 20 | |

SUMMARY OF THE INVENTION

The aim of the present invention is to obtain, from a dry cement mix based on a hydraulic binder and an aggregate, lightweight concretes that possess all of the following properties: density of less than 1,000 Kg/m$^3$; low thermal conductivity of less than 0.25 W/mK; fire resistance; vapour permeability; mechanical strength; environmental sustainability, in particular due to the possibility of using recycled material.

The cement mix itself must show good workability when turned into paste by adding water, as described below. This aim is achieved according to the present invention with a dry cement mix based on a hydraulic binder and a glass aggregate for forming light concretes with low thermal conductivity, characterised in that said glass aggregate comprises a fine fraction consisting of granulated aggregate with a particle size from 0.5 to 2 mm, and a coarse fraction consisting of crushed aggregate with a particle size from 4 to 20 mm, obtaining for said glass aggregate the following total particle size distribution:

| Diameter [mm] | Passing fraction [%] |
|---|---|
| 1 | 6-55 |
| 8 | 55-60 |
| 16 | 60-95 |

Preferably, in said mix, said fine fraction consists of granulated aggregate with a particle size from 0.5 to 1 mm, and said coarse fraction consists of crushed aggregate with a particle size from 8 to 16 mm.

More preferably, in said mix, said vitreous aggregate includes recycled material, for example foamed glass.

As the hydraulic binder according to the present invention, cements can be used that conform to the standard UNI EN 197-1, or binders according to the standard UNI EN 413. In addition, in a preferred embodiment of the present invention, the cement is CEM I 52.5 R.

In general, the hydraulic binder is present in a percentage between 15% and 40% by weight, preferably between 20% and 25% by weight of the total weight of the dry cement mix.

With respect to the workability of the above-mentioned aqueous paste, we use the method defined as the slump test according to UNI EN 12350/2, which measures the deformation that the paste with water undergoes as a result of its own weight when removed from the vessel holding it. According to the aims of the present invention, a slump greater than 100 mm is desired.

Surprisingly, it was found that the concretes made from a dry cement mix according to the invention, containing vitreous aggregates as well as recycled aggregates, also show density values lower than 1,000 Kg/m$^3$, compressive strength values higher than 4 MPa and thermal conductivity values lower than 0.25 W/mK.

In addition, the aqueous pastes of the cementitious mix of the invention are characterised by a slump greater than 100 mm.

A dry cement mix according to the present invention may also contain additional components, such as ash and air-entraining agents.

The ash can be contained as a percentage of between 5 and 10% of the total weight of the dry mix, and can improve the rheological characteristics of the mix, such as its workability.

In addition, in a preferred embodiment of the present invention, it is intended to introduce an air-entraining agent into the cement matrix, for example a suitable surfactant additive that functions as a source of air bubbles, thus lightening the mortar and intercepting the pores present in it to limit the phenomenon of capillary suction. At the same time, the system of air bubbles allows greater vapour permeability.

A different embodiment of the present invention anticipates the combined use of hydraulic lime with an air-entraining agent.

The following non-limiting examples are reported for the purpose of illustrating the present invention.

BRIEF DESCRIPTION OF THE DRAWING

They also refer to FIG. 1 of the attached drawing, which shows a graph of the particle size distribution, i.e. the passing fraction percentage against the sieve opening expressed in microns, compared to a vitreous aggregate (example 1), an aggregate according to the invention and the known theoretical Fuller's curve as the reference standard, as described below.

DETAILED DESCRIPTION OF THE INVENTION

Examples

Example 1

Comparison

We prepared a dry cement mix comprising a lightweight aggregate only from crushing, consisting of two sieve fractions, the first from 0 to 8 mm, and the second from 8 to 16 mm, with a particle size distribution (passing fraction percentage as a function of the particle diameter/openings of the sieves) in line with the theoretical Fuller's curve.

From this, we therefore prepared an aqueous paste according to the composition indicated in the table below.

| | | |
|---|---|---|
| CEM I 52.5 R | [Kg] | 214.4 |
| Ash | [Kg] | 96.3 |
| Crushed aggregate 8-16 mm | [Kg] | 246.4 |
| Crushed aggregate 0-8 mm | [Kg] | 454.6 |
| Water | [Kg] | 238.45 |

From this composition, we obtained the following results for density, workability, strength and thermal conductivity:

| | | |
|---|---|---|
| Density | [Kg/m$^3$] | 1267 |
| Slump | [mm] | 40 |
| a/c | [—] | 0.77 |
| Rcm 3 | [MPa] | 6.5 |
| Rcm 7 | [MPa] | 8.5 |
| Rcm 28 | [MPa] | 11 |
| Thermal conductivity | [W/mK] | 0.269 |

The density (mass density on the fresco) was calculated according to UNI EN 12350-6, the workability (slump test) was calculated according to UNI EN 12350-2, the mechanical compressive strength (average cubic resistance Rcm after 3, 7, 28 days) was calculated according to UNI EN 12390-3, and the conductivity was calculated using the following method. The test was performed on a cylindrical specimen (ø 100 mm, h 50 mm) under dry conditions (specimen kept in an oven at 40° C. for 24 hours), with equipment fitted with a surface probe to measure the thermal characteristics of the solid materials (ISOMET Heat Transfer Analyzer Model 2104).

The results obtained, as shown in the table above, are not satisfactory because the density values are greater than 1000 Kg/m$^3$. A lack of workability (slump <100 mm) is also apparent, with a consequent increased water requirement. The conductivity value is greater than 0.25 W/mK, and is therefore not suitable.

Example 2

Invention

We prepared a dry cement mix comprising two different vitreous aggregates from recycling, one "from crushing" and the other "from granulation".

These aggregates were distributed according to a discontinuous particle size curve according to the present invention, i.e.

| Diameter [mm] | Passing fraction [%] |
|---|---|
| 1 | 6-55 |
| 8 | 55-60 |
| 16 | 60-95 |

In particular, the particle size distribution of the dry cement mix as a whole was constructed with one very fine part made from cement with a particle diameter up to 150 microns, the aggregate "from granulation" with a diameter in the range of 0.5-1 mm and the aggregate "from crushing" with a diameter in the range of 8-16 mm. The latter was washed to remove any fine particles that may be present. From this, we therefore prepared an aqueous paste according to the composition indicated in the table below.

| | | |
|---|---|---|
| CEM I 52.5 R | [Kg] | 214.4 |
| Ash | [Kg] | 96.3 |
| Aggregate "from crushing" 8-16 | [Kg] | 246.4 |
| Aggregate "from granulation" 0.5-1 | [Kg] | 152.8 |
| Water | [Kg] | 238.45 |

From this composition, we obtained the following results for density, workability, strength and thermal conductivity:

| | | |
|---|---|---|
| Density | [Kg/m$^3$] | 953 |
| Slump | [mm] | 110 |
| a/c | [—] | 0.77 |
| Rcm 3 | [MPa] | 7.3 |
| Rcm 7 | [MPa] | 8.35 |
| Rcm 28 | [MPa] | 10 |
| Thermal conductivity | [W/mK] | 0.208 |

The density, workability, mechanical compressive strength and conductivity were determined according to the methods described in Example 1.

Compared to Example 1, at the same water-cement ratio, the results showed a significant decrease in density (value lower than 1000 kg/m$^3$), a decrease in thermal conductivity (value lower than 0.25 W/mK), improved workability (slump greater than 100 mm), and comparable strength.

Example 3

Invention (and Comparison) with Air-Entraining Agent

We prepared a pair of dry cement mixes MIX 1 and MIX 2 as specified below.

MIX 1 is the same composition as indicated in Example 1, with the addition of an air-entraining surfactant, and is therefore a comparison mix.

MIX 2 is the same composition as indicated in Example 2, with the addition of the same air-entraining surfactant as in MIX 1, and is therefore a mix according to the invention.

From this, we therefore prepared the aqueous pastes according to the composition indicated in the table below:

|  |  | MIX 1 | MIX 2 |
|---|---|---|---|
| CEM I 52.5 R | [Kg] | 214.4 | 214.4 |
| Ash | [Kg] | 96.3 | 96.3 |
| Aggregate "from crushing" 8-16 | [Kg] | 246.4 | 246.4 |
| Aggregate "from crushing" 0-8 | [Kg] | 454.6 | — |
| Aggregate "from granulation" 0.5-1 | [Kg] | — | 152.8 |
| Water | [Kg] | 238.45 | 238.45 |
| Air-entraining agent | [Kg] | 0.64 | 0.64 |

From such compositions, we obtained the following results for density, workability, strength and thermal conductivity:

|  |  | MIX 1 | MIX 2 |
|---|---|---|---|
| Density | [Kg/m$^3$] | 1012 | 886 |
| Slump | [mm] | 100 | 230 |
| a/c | [—] | 0.77 | 0.77 |
| Rcm 3 | [MPa] | 1.9 | 5 |
| Rcm 7 | [MPa] | 2.95 | 7 |
| Rcm 28 | [MPa] | 5 | 8.5 |
| Thermal conductivity | [W/mK] | 0.192 | 0.163 |

The density, workability, mechanical compressive strength and conductivity were determined according to the methods described in Example 1.

Compared to examples 1 and 2, it was observed that, as expected, the air-entraining agent can still achieve, for both MIX 1 and MIX 2, a reduction in the density (respectively, from 1267 to 1012 Kg/m$^3$, and from 953 to 886 Kg/m$^3$) and an increase in the workability (respectively, from 40 to 100 mm and from 110 to 230 mm), compared with a loss of compressive strength after 28 days (respectively, from 11 to 5 MPa and from 10 to 8.5 MPa). In addition, the conductivity decreased in both cases (from 0.269 to 0.192 W/mK and from 0.208 to 0.163 W/mK).

However, in the case of MIX 2 (the invention), the compressive strength remains greater than the 4 MPa limit from just three days of maturation (see Rcm3, from 7.3 to 5 MPa), whereas for MIX 1, it drops dramatically (from 5 to 1.9 MPa).

The data confirms that, according to the invention, there is a synergistic effect in the selection of the particle size distribution of the vitreous aggregate.

In fact, it is believed, in general terms, that it is possible to achieve all of the advantageous properties described above through a synergistic effect of the two different vitreous aggregates, i.e. a vitreous aggregate produced by crushing and a vitreous aggregate produced by granulation, with the overall particle size distribution of a substantially discontinuous type. In fact, in such a distribution, some sizes or classes of aggregates are substantially absent; within the selected particle size distribution, we thus create a range of sizes that is not occupied by the aggregates but rather only by the cement matrix In this respect, FIG. 1 shows a graph of the particle size distribution compared to the comparison vitreous aggregate according to example 1 above, which is substantially in line with the known theoretical Fuller's curve represented there as the reference standard, and an aggregate according to the invention.

It is noted that the curve relating to the latter deviates markedly from the other two, with a sharp increase to be called a step in the particle size zone that is critically selected.

Thanks to the many advantageous properties which it is able to confer both on the processing paste and on the final product, the dry cement mix according to the invention is suitable for forming a variety of lightweight concrete products with low thermal conductivity, in particular non-structural construction components such as in-fill panels, blocks, screeds and the like.

These include, in particular, the double-leaved panels for insulation of residential buildings.

The invention claimed is:

1. A dry cement mix based on a hydraulic binder and a glass aggregate for forming light concretes with low thermal conductivity, characterized in that said glass aggregate comprises a fine fraction consisting of granulated aggregate with a particle size from 0.5 to 2 mm, and a coarse fraction consisting of crushed aggregate with a particle size from 4 to 20 mm, obtaining for said glass aggregate the following total particle size distribution

| Diameter [mm] | Passing [%] |
|---|---|
| 1 | 6-55 |
| 8 | 55-60 |
| 16 | 60-95. |

2. The mix according to claim 1, characterized in that said fine fraction consists of granulated aggregate with a particle size from 0.5 to 1 mm, and said coarse fraction consists of crushed aggregate with a particle size from 8 to 16 mm.

3. The mix according to claim 1, characterized in that said glass aggregate is recycled material.

4. The mix according to claim 1, characterized in that said glass aggregate is foamed glass.

5. The mix according to claim 1, characterized in that said hydraulic binder is contained from 15% to 40% by weight with respect to the total weight of the dry cement mix.

6. The mix according to claim 1, characterized in that it comprises ashes.

7. The mix according to claim 1, characterized in that it comprises at least one air entraining agent.

8. The mix according to claim 7, characterized in that it comprises hydraulic lime containing said air entraining agent.

9. A light concrete product with low thermal conductivity formed by a cement mix according to claim 1.

10. A product according to claim 9, characterized in that it is a non-structural building element.

11. A product according to claim 10, characterized in that it is a double-plate panel for the insulation of buildings.

12. A product according to claim 10, characterized in that it is a panel.

* * * * *